(12) United States Patent  (10) Patent No.: US 7,658,557 B2
Lu  (45) Date of Patent: Feb. 9, 2010

(54) CAMERA DEVICE

(75) Inventor: Ho-Lung Lu, Taipei Hsien (TW)

(73) Assignee: Dexin Corporation, Taipei Hsien (TW)

( * ) Notice: Subject to any disclaimer, the term of this patent is extended or adjusted under 35 U.S.C. 154(b) by 421 days.

(21) Appl. No.: 11/707,978

(22) Filed: Feb. 20, 2007

(65) Prior Publication Data

US 2008/0199175 A1    Aug. 21, 2008

(51) Int. Cl.
*G03B 17/00* (2006.01)
*G03B 17/48* (2006.01)
*G03B 17/02* (2006.01)

(52) U.S. Cl. .................. 396/428; 396/429; 396/535; 348/207.1; 348/373

(58) Field of Classification Search ............... 396/419, 396/428, 429, 535; 348/207.1, 373
See application file for complete search history.

(56) References Cited

U.S. PATENT DOCUMENTS 5,475,441 A * 12/1995 Parulski et al. ............. 348/552
6,323,902 B1 * 11/2001 Ishikawa .................... 348/373
6,366,316 B1 * 4/2002 Parulski et al. ............. 348/239
6,654,050 B2 * 11/2003 Karube et al. ............. 348/220.1
6,686,958 B1 * 2/2004 Watanabe et al. .......... 348/231.1
6,890,690 B2 * 5/2005 Wexler et al. ................ 430/11
6,893,267 B1 * 5/2005 Yueh ............................ 439/8
6,933,981 B1 * 8/2005 Kishida et al. ............. 348/375
6,992,721 B1 * 1/2006 Kambayashi et al. ....... 348/373
7,379,664 B2 * 5/2008 Marcus ....................... 396/56
2006/0089171 A1 * 4/2006 Yoo et al. .................... 455/557

* cited by examiner

*Primary Examiner*—Christopher Mahoney
(74) *Attorney, Agent, or Firm*—Rosenberg, Klein & Lee

(57) ABSTRACT

A camera device comprises a first main body, a pivoting component, a second main body, and a camera unit. A first connection member is disposed on the side end of the first main body. One end of the pivoting component is pivotally connected with the first main body. The second main body is pivotally fixed at the other end of the pivoting component, and is electrically connected to the first main body. The camera unit is electrically connected to the second main body. The first connection member of the first main body is first electrically connected with a predetermined electronic device to attach the first main body, and the second main body then rotates relative to the first main body via the pivoting component to adjust the visual angle of the camera unit.

16 Claims, 10 Drawing Sheets

CAMERA DEVICE

BACKGROUND OF THE INVENTION

1. Field of the Invention

The present invention relates to a camera device and, more particularly, to a highly portable camera device, which provides a predetermined slot for connection with an electronic device, and the visual angle of the camera device can be adjusted for taking pictures according to the position of the camera device provided by the electronic device and the location of the person or object being photographed so that the person or object the user wishes to photograph enters the image-capturing range of the camera device.

2. Description of Related Art

With the continual progress of science and technology, Internet communication has today become an indispensable part of everyday life for most people. As part of this development electronic devices (e.g., notebook computers, desktop computers, video game consoles, PDAs, and mobile phones) have become widely used for writing text, sending and receiving emails and SMS messages, voice communication, and self-contained games. By using camera devices with related software of electronic devices, people can directly perform the functions of network communication, video chatting, video conferencing, and computer gaming. Not only can clear and convenient video effects be provided, but many other situations and uses in the industry can also arise. Therefore, video devices have become indispensable tools in video communication.

Network video communication, however, needs to use camera devices to photograph and process the collected images using the related software of electronic devices, and then transmit the processed images another device over a wireless network, Bluetooth communication, or other similar means. Therefore, it is necessary for camera devices to first connect to an electronic device and then output images via the electronic device. Existent camera devices in the market primarily have a support bracket with a camera sphere disposed thereon. A transmission cable extends from a side end of the camera sphere, and a USB connector is provided at the distal end of the transmission cable. The camera sphere is connected to a corresponding slot on the electronic device so that video captured by the camera sphere can be displayed on the electronic device and then transmitted.

The above conventional camera devices have the following drawbacks in practice:

1. The slot provided on a common electronic device such as a notebook computer is usually located on the side of the electronic device. In order to get a better angle for videoing, the conventional camera device is usually locked on the display screen and its USB connector at the distal end of the transmission cable is inserted into the slot. Because the angle of the video is limited, a conventional camera device cannot be directly inserted into the slot. Rather, it needs to be fixed at a good position for capturing video and is then connected to the electronic device via the transmission cable. The assembly process is very cumbersome, and the long transmission cable can easily interfere with the operation of the electronic device or even cause an entanglement problem, hence resulting in much trouble for the user.

2. Because the conventional camera device needs a support bracket and a transmission cable, it has a large size and is not portable. Moreover, the transmission cable can easily cause entanglements and is subject to breaking. Because the most important feature of a camera device is to provide a real-time video function for various electronic devices of compatible specifications, if the camera device cannot be conveniently carried around by a user for plug-and-play use, the convenience it emphasizes and its market value will be greatly reduced.

3. The installation position of the support bracket needs to be moved to adjust the video-capturing height and angle, causing much inconvenience in use.

Accordingly, the present invention aims to provide a novel camera device to solve the above problems in the prior art.

SUMMARY OF THE INVENTION

An object of the present invention is to provide a camera device, which is highly portable and easily connected, and angle of the camera device can be adjusted to capture an image according to the position of the camera device and the location of a person or object that is to be photographed so that the person or object is within the image-capturing range of the camera device.

To achieve the above object, the present invention provides a camera device, which comprises a first main body, a pivoting component, a second main body, and a camera unit. A first connection member is disposed on the side end of the first main body. One end of the pivoting component is pivotally connected with the first main body. The second main body is pivotally fixed at the other end of the pivoting component, and is electrically connected to the first main body. The camera unit is electrically connected to the second main body. The first connection member of the first main body must firstly be electrically connected with a predetermined electronic device to attach the first main body, and the second main body then rotates relative to the first main body via the pivoting component to adjust the visual angle of the camera unit.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
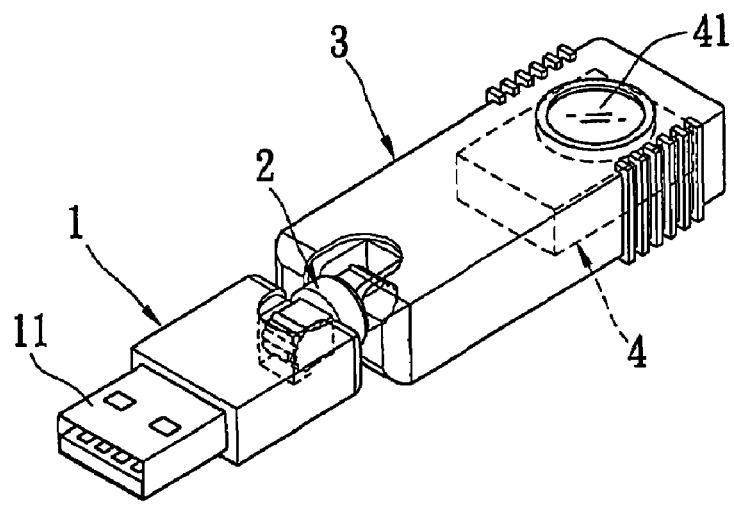
FIG. 1 is a perspective view of the present invention.
Figure 2:
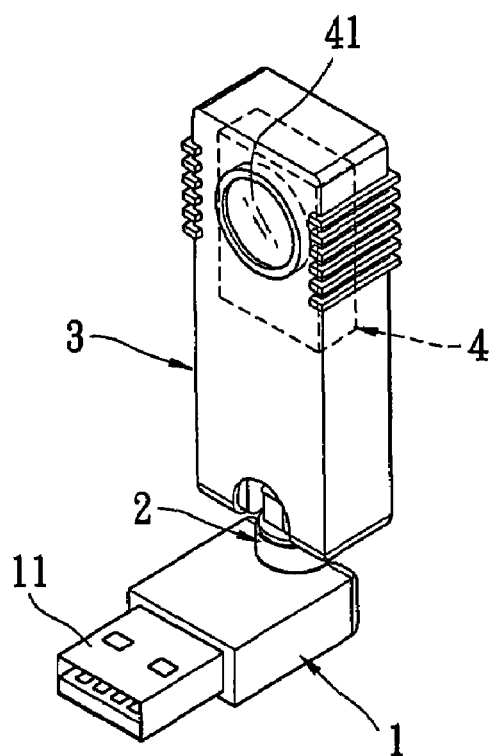
FIG. 2 is a perspective view of the present invention with the second connection member adjusted to stand erect.
Figure 3:
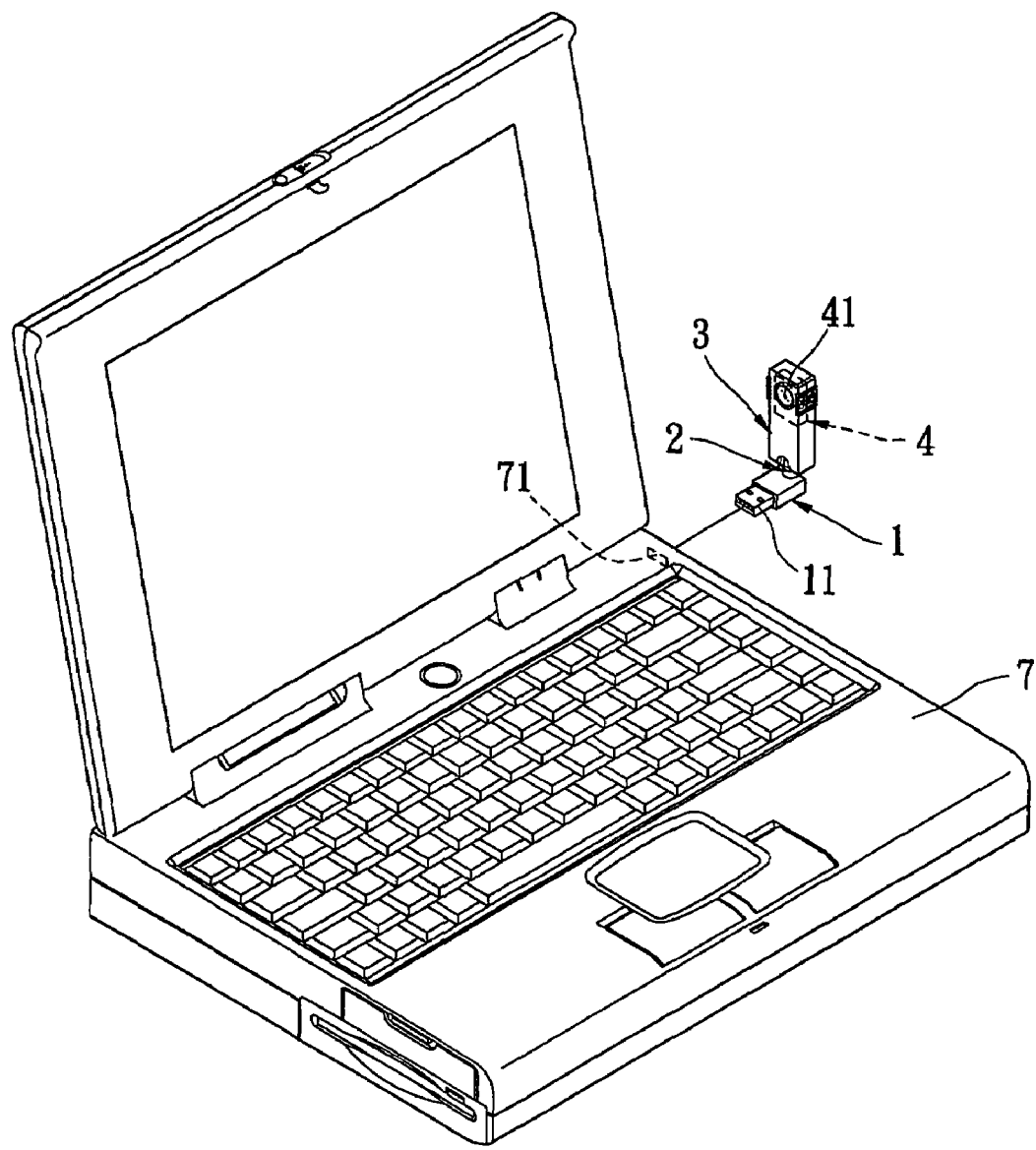
FIG. 3 is a perspective view showing how the first connection member is inserted into a slot of an electronic device according to a first embodiment of the present invention.

As shown in FIGS. 1, 2 and 3, the present invention provides a camera device electrically connected to an electronic device 7. The camera device comprises a first main body 1, a pivoting component 2, a second main body 3, and a camera unit 4. The first main body 1 has a first connection member 11 disposed on the side end thereof. The first connection member 11 can be an USB or IEEE1394 connector. The pivoting component is a universal joint. One end of the pivoting component 2 is pivotally connected with the first main body 1. The second main body 3 is pivotally fixed on the other end of the pivoting component 2, and is electrically connected to the first main body 1. The camera unit 4 is disposed in the second main body 3, and is electrically connected to the second main body 3. The camera unit 4 has a camera lens 41 exposed out of a side surface of the second main body 3.

Figure 4:
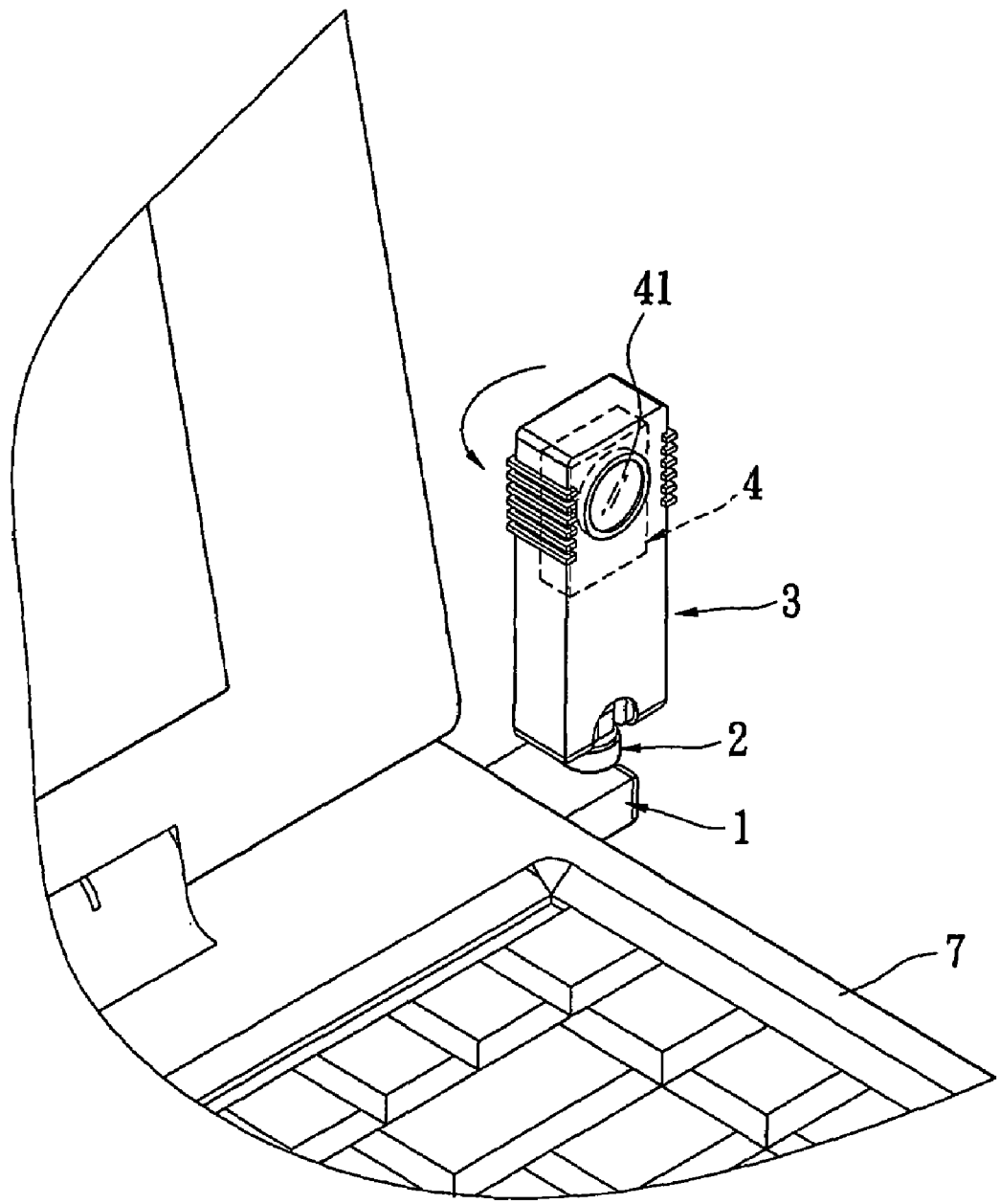
FIG. 4 is a perspective view showing how the visual angle of the camera unit is adjusted according to the first embodiment of the present invention.

As shown in FIGS. 1, 3 and 4, in this embodiment, the electronic device 7 can be a notebook computer. The first connection member 11 of the first main body 1 is directly and electrically inserted into a predetermined first slot 71 conforming to USB or IEEE1394 specifications to connect with the first main body 1. When taking a picture, the user can directly turn the second main body 3 via the pivoting component 2 to rotate the second main body 3 relative to the first main body 1 so as to adjust the visual angle of the camera unit 4 for aiming the camera. After using the camera device, the user only has to pull the first connection member 11 out of the first slot 71. The camera device can then be put away or even carried around in the user's pocket; hence the device is highly convenient and portable.

Figure 5:
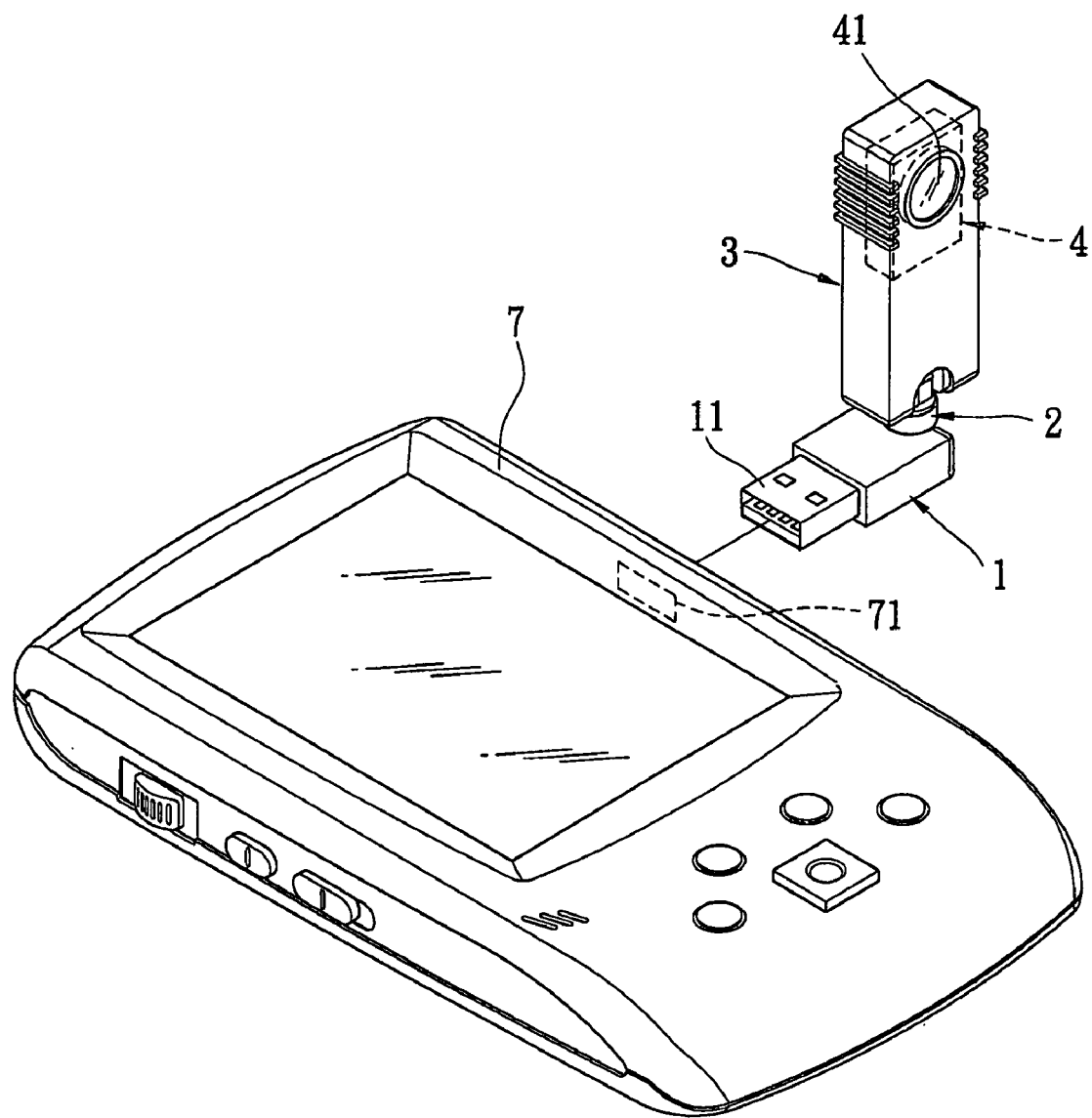
FIG. 5 is an exploded perspective view according to a second embodiment of the present invention.

As shown in FIG. 5, the electronic device 7 is a PDA according to a second embodiment of the present invention.

Figure 6:
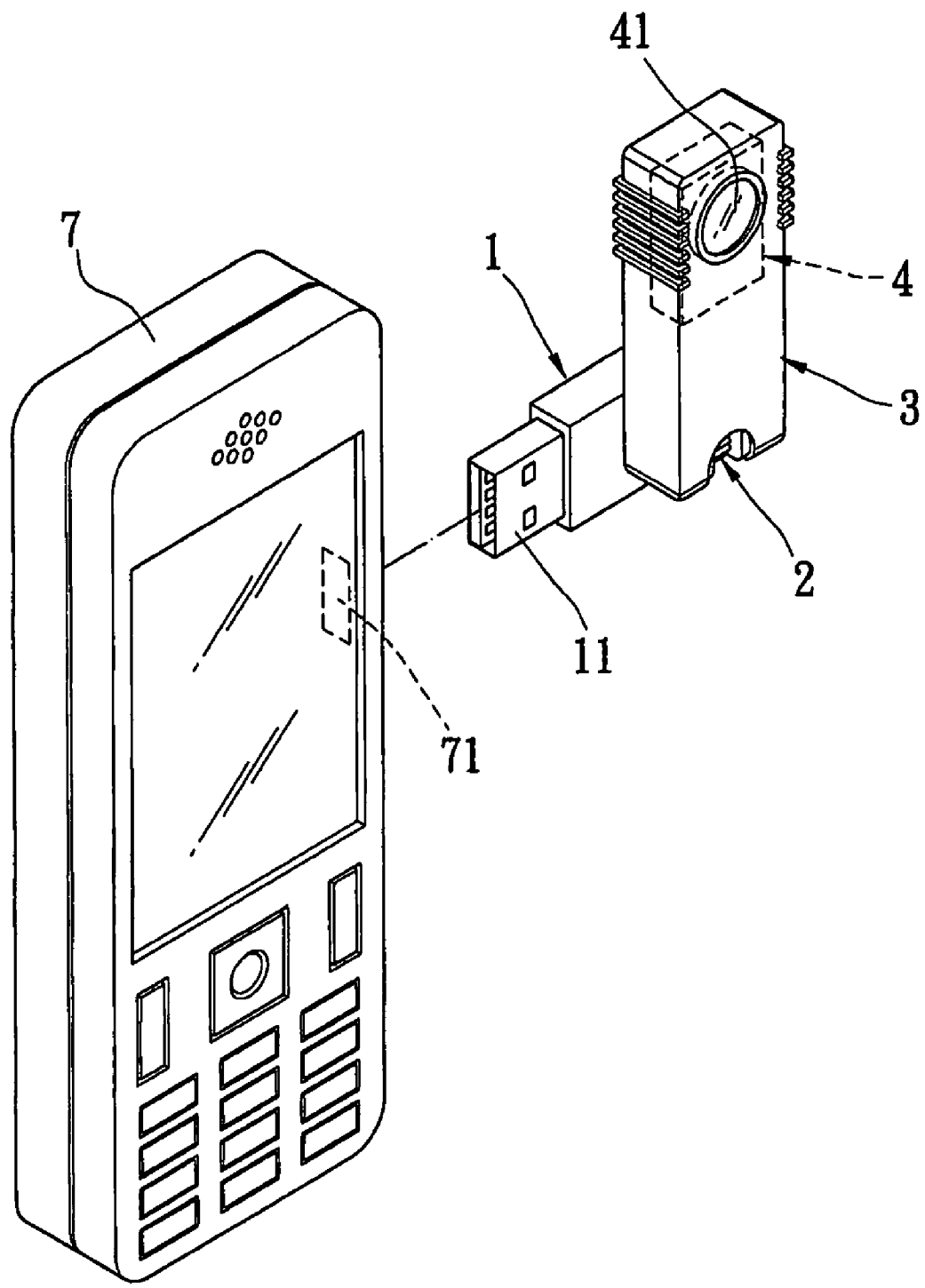
FIG. 6 is an exploded perspective view according to a third embodiment of the present invention.

As shown in FIG. 6, the electronic device 7 is a mobile phone according to a third embodiment of the present invention.

The electronic device 7 can also be a desktop computer or a video game console (not shown) according to a fourth embodiment of the present invention.

Figure 7:
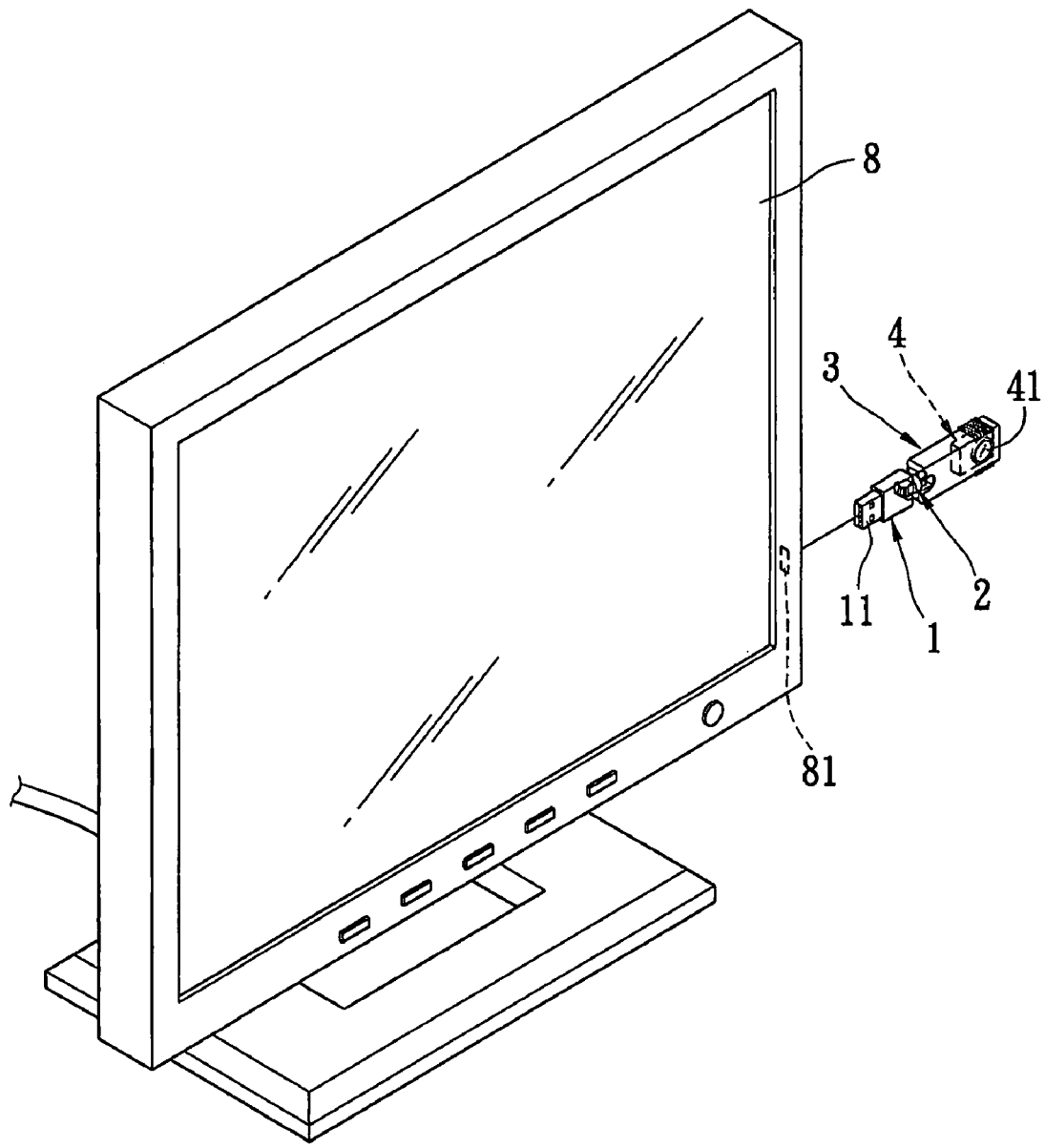
FIG. 7 is an exploded perspective view according to a fifth embodiment of the present invention.

FIG. 7 is an exploded perspective view according to a fifth embodiment of the present invention. As shown in FIG. 7, the first connection member 11 is electrically inserted into an adapter 8. The adapter 8 is a liquid crystal display (LCD). A predetermined second slot 81 at a predetermined position on the side end of the adapter 8 is inserted by the first connection member 11 so that data can be outputted and received by at least one of the electronic devices 7 in a wired or wireless (e.g., Bluetooth, infrared, or wireless network) manner.

Figure 8:
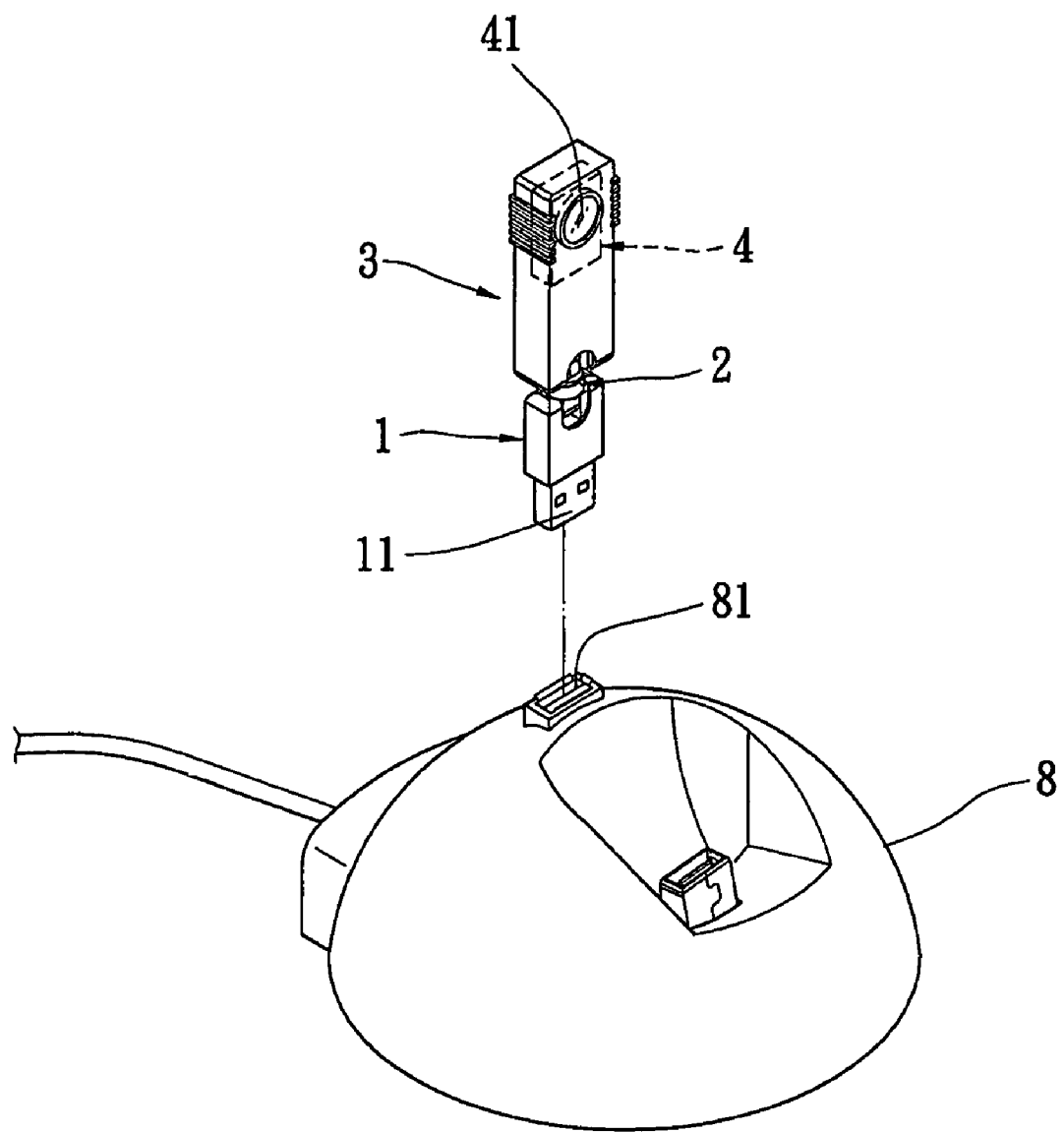
FIG. 8 is an exploded perspective view according to a sixth embodiment of the present invention.

FIG. 8 is an exploded perspective view according to a sixth embodiment of the present invention. As shown in FIG. 8, the adapter 8 is a docking bay. The accommodation seat can be a mouse, a mouse charger, or a mobile phone charger.

Figure 9:
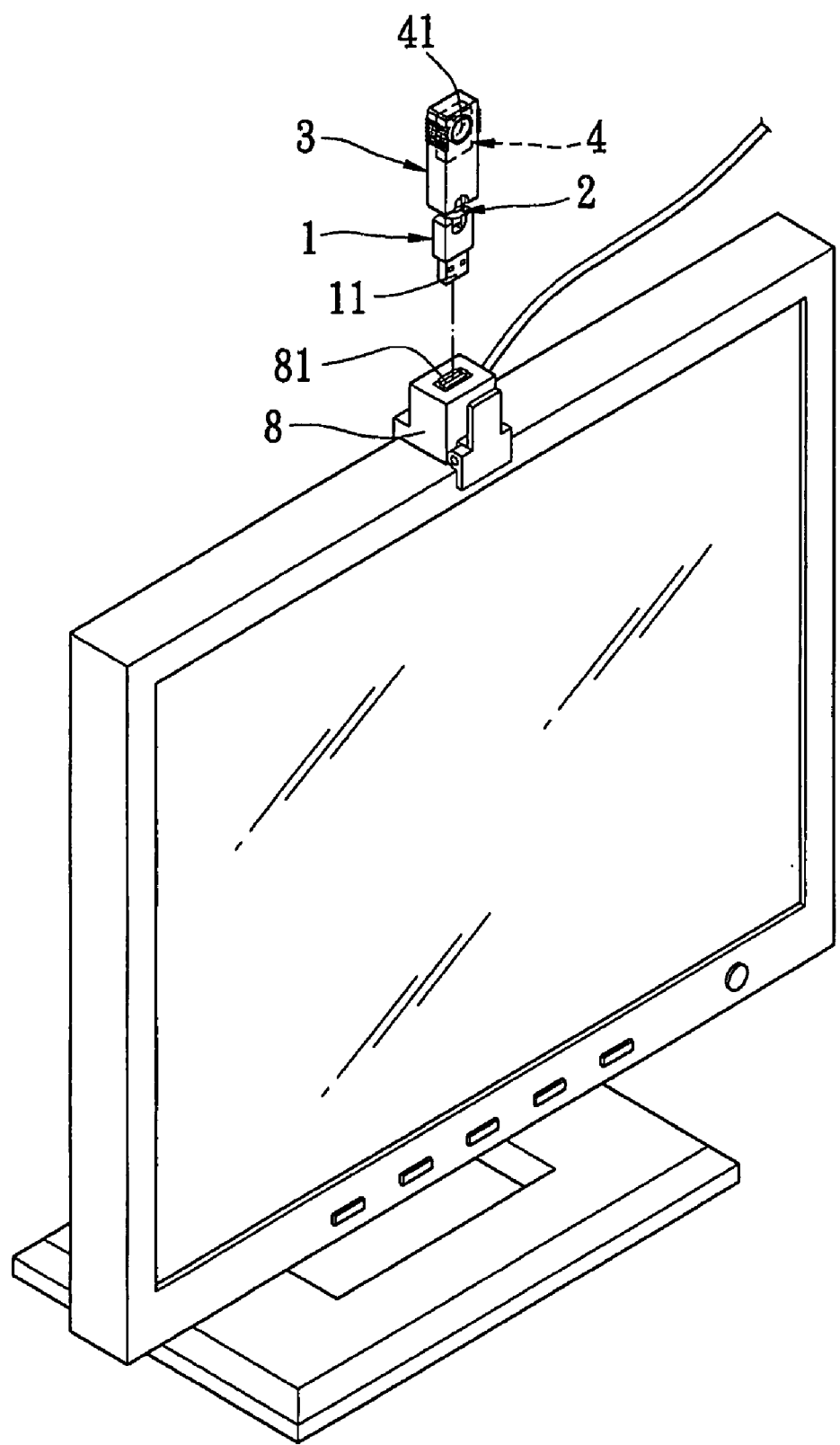
FIG. 9 is an exploded perspective view according to a seventh embodiment of the present invention.

FIG. 9 is an exploded perspective view according to a seventh embodiment of the present invention. As shown in FIG. 9, the adapter 8 is a fixing clip, which is clipped on a desk, a display, or any object that can be clipped.

Figure 10:
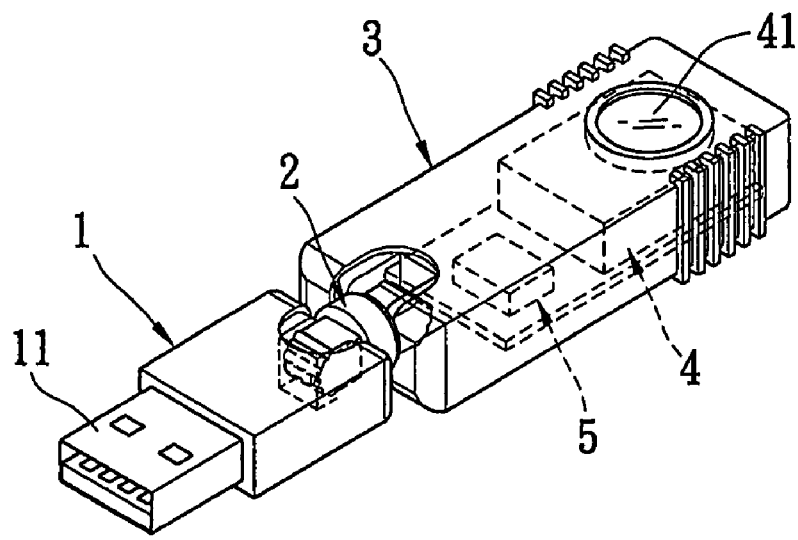
FIG. 10 is an exploded perspective view according to an eighth embodiment of the present invention.

FIG. 10 is an exploded perspective view according to an eighth embodiment of the present invention. As shown in FIG. 10, the camera device further comprises a storage unit 5 in the first main body 1 or the second main body 3. The storage unit 5 is used to store image data captured by the camera unit 4 or other types of data.

Figure 11:
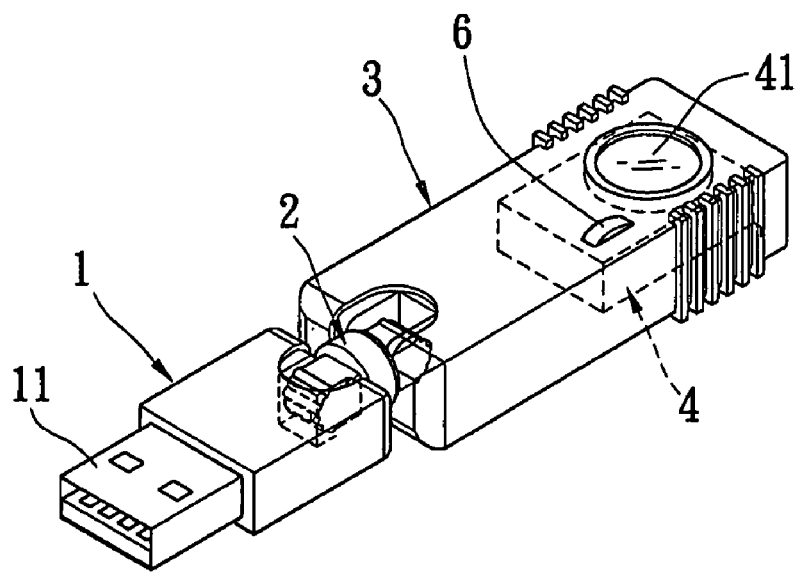
FIG. 11 is an exploded perspective view according to a ninth embodiment of the present invention.

FIG. 11 is an exploded perspective view according to a ninth embodiment of the present invention. As shown in FIG. 11, the camera device further comprises a wireless signal unit 6 in the first main body 1 or the second main body 3. The wireless signal unit 6 receives and emits wireless signals.

Figure 12:
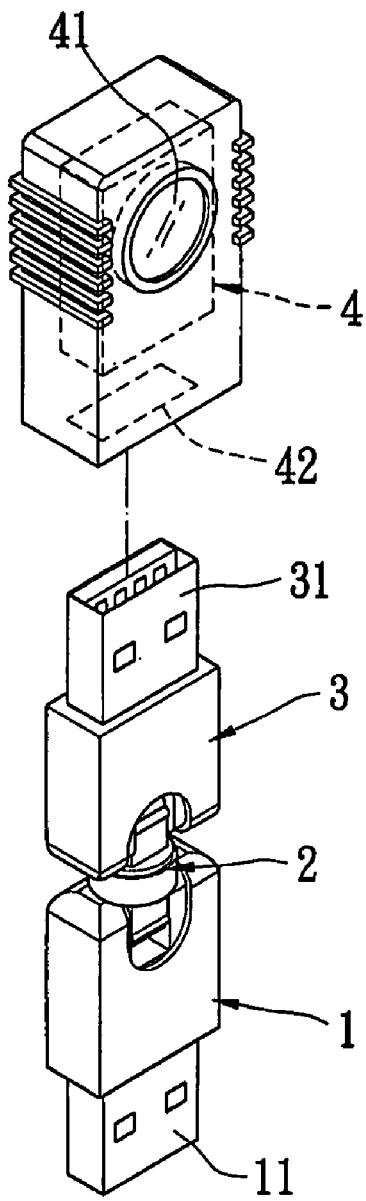
FIG. 12 is an exploded perspective view according to a tenth embodiment of the present invention.

FIG. 12 is an exploded perspective view according to a tenth embodiment of the present invention. As shown in FIG. 12, at least a second connection member 31 conforming to USB or IEEE1394 specifications is disposed on at least one side of the second main body 3. The second connection member 31 has an electric connector protruding out from the second main body 3. A third connection member 42 is provided on a side surface of the camera unit 4. The third connection member 42 has a slot recessedly formed at the camera unit 4. The third connection member 42 is mated with the second connection member 31.

Figure 13:
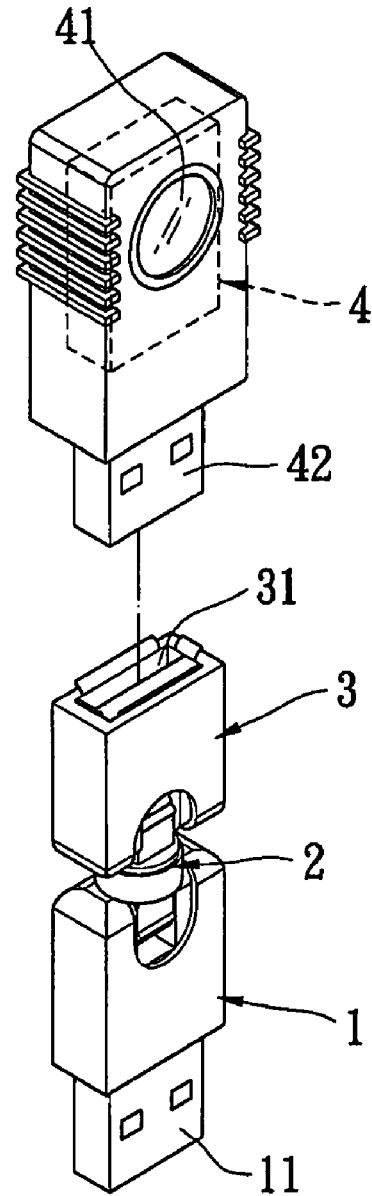
FIG. 13 is an exploded perspective view according to an eleventh embodiment of the present invention.

FIG. 13 is an exploded perspective view according to an eleventh embodiment of the present invention. As shown in FIG. 13, the second connection member 31 has a slot recessedly formed on the second main body 3. The third connection member 42 has an electric connector protruding out of the camera unit 4. The third connection member 42 mates with the second connection member 31.

To sum up, the present invention has the following advantages:

1. The present invention can be directly inserted into an electronic device 7 without using a transmission cable. The pivoting component 2 can be turned to adjust the visual angle according to the location of the person or object to be photographed. The problems of the attached transmission cable getting in the user's way or becoming entangled are solved to reduce the trouble caused to users and enhance convenience.
2. Because the camera device of the present invention requires neither a support bracket nor a transmission cable, it has a small size and is highly portable. The camera device can be carried around for plug-and-play use with various kinds of electronic devices of compatible specifications to provide a real-time video function for users, thereby enhancing the convenience and the market value of the camera device.
3. Because the present invention is inserted into an electronic device 7, adjusting the image-capturing height and angle is possible via the pivoting component 2, hence the camera device is convenient to use.
4. The present invention can also be inserted into an adapter 8 to output signal data via the adapter 8.
5. The present invention can further comprise a storage unit 5 for storing data.
6. The present invention can further comprise a wireless signal unit 6 for receiving and emitting wireless signals.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A camera device comprising:
a first main body having a first connection member located on a side end of said first main body and a U-shaped groove disposed on an opposing end thereof;

a pivoting component, which is a universal joint rotatable in three axis, with one end thereof pivotally connected with said first main body;

a second main body having a U-shaped groove disposed within an end section of said second body, the U-shaped groove of first main body and the second main body pivotally coupled to opposing ends of the pivoting component; the second main body electrically connected to said first main body, each of said first and second main body having an obverse sidewall and a reverse side wall, wherein the obverse and reverse side walls of the second main body can lean against the obverse and reverse side walls of the first main body; and a camera unit electrically connected to and disposed within said second main body.

2. The camera device as claimed in claim 1, wherein said first connection member is an electric connector conforming to USB specifications.

3. The camera device as claimed in claim 1, wherein said first connection member is an electric connector conforming to IEEE1394 specifications.

4. The camera device as claimed in claim 1, wherein said camera unit is disposed in said second main body, and has a camera lens exposed out of a side surface of said second main body.

5. The camera device as claimed in claim 1, wherein at least a second connection member is disposed at least one side of said main body, and a third connection member for mating with said second connection member is disposed on a side surface of said camera unit.

6. The camera device as claimed in claim 5, wherein said second and third connection members conform to USB specifications.

7. The camera device as claimed in claim 5, wherein said second and third connection members conform to IEEE1394 specifications.

8. The camera device as claimed in claim 5, wherein said second connection member has an electric connector protruding out of said second main body, and said third connection member has a slot recessedly formed on said camera unit.

9. The camera device as claimed in claim 5, wherein said second connection member has a slot recessedly formed on said second main body, and said third connection member has an electric connector protruding out of said camera unit.

10. The camera device as claimed in claim 1, wherein said first connection member is electrically inserted into a slot of the corresponding specification of a predetermined electronic device.

11. The camera device as claimed in claim 10, wherein said electronic device is a desktop computer, a notebook computer, a video game console, a PDA, or a mobile phone.

12. The camera device as claimed in claim 1, wherein said first connection member is electrically inserted into a slot disposed at a predetermined position of an adapter, and signals are outputted via said adapter to be received by at least one electronic device.

13. The camera device as claimed in claim 12, wherein said adapter is a display, a mouse, a mouse charger, a mobile phone charger, a docking bay, or a fixing clip.

14. The camera device as claimed in claim 12, wherein said adapter transfers signals to said electronic device in a wired or wireless manner.

15. The camera device as claimed in claim 1 further comprising a storage unit, wherein said storage unit is disposed in said first main body or said second main body.

16. The camera device as claimed in claim 1 further comprising a wireless signal unit wherein said wireless signal unit is disposed in said first main body or said second main body.

* * * * *